United States Patent [19]
Riojas

[11] Patent Number: 6,056,271
[45] Date of Patent: May 2, 2000

[54] POST PULLER

[76] Inventor: Raul Riojas, 829 Krenek Stryk Rd., Schulenburg, Tex. 78956

[21] Appl. No.: 09/141,758

[22] Filed: Aug. 27, 1998

[51] Int. Cl.[7] .................................................... F21B 19/00
[52] U.S. Cl. ........................................... 254/30; 254/29 R
[58] Field of Search .............................. 254/30, 31, 29 R, 254/124, 132

[56] References Cited

U.S. PATENT DOCUMENTS

| | | |
|---|---|---|
| 672,910 | 4/1901 | Linerode ..................................... 254/31 |
| 935,020 | 9/1909 | Harvey . |
| 1,018,936 | 2/1912 | Smith ......................................... 254/31 |
| 1,107,955 | 8/1914 | James ......................................... 254/31 |
| 1,774,661 | 9/1930 | Otto . |
| 2,436,510 | 2/1948 | Ferguson . |
| 2,553,077 | 5/1951 | Braun . |
| 2,683,019 | 7/1954 | Saunders et al. . |
| 3,059,905 | 10/1962 | Tompkins . |
| 3,066,915 | 12/1962 | Linaberry, Sr. . |
| 3,549,126 | 12/1970 | DeVries . |
| 3,647,185 | 3/1972 | Phibbs ........................................ 254/30 |
| 3,823,916 | 7/1974 | Shaw . |
| 3,907,253 | 9/1975 | Schosek ................................ 254/29 R |
| 4,256,286 | 3/1981 | Hudgins .................................... 254/30 |
| 4,329,791 | 5/1982 | Honkanen ................................ 254/124 |
| 4,371,018 | 2/1983 | Arnold ........................................ 254/30 |
| 4,706,935 | 11/1987 | Thompson . |
| 4,721,335 | 1/1988 | Knenek . |
| 5,211,374 | 5/1993 | Head et al. ............................. 254/29 R |
| 5,242,152 | 9/1993 | Schatz ........................................ 254/30 |

Primary Examiner—James G. Smith
Assistant Examiner—Lee Wilson
Attorney, Agent, or Firm—John R Casperson

[57] ABSTRACT

A post puller and a method of use are described herein. The method of the invention entails lowering a collar over a top end of the post. The collar is carried by a suitable frame. The frame is attached to a bucket which forms a portion of a front end loader attached to a tractor. The bucket of the front end loader is tilted to engage an upper end and a lower end of the collar with the post. The bucket is then raised to pull the post from the earth. The puller is formed from a frame and a collar. The frame has an open upper end, an open lower end, a front side, and a back side. The frame has a longitudinal axis extending from the open upper end to the open lower end. The collar is mounted inside of the frame. The collar has an open upper end positioned near the open upper end of the frame, an open lower end positioned near the open lower end of the frame, a front side positioned near the front side of the frame, and a back side positioned near the back side of the frame. The collar defines a passage having a longitudinal axis extending from the open upper end to the open lower end to accept the post. During use, the collar slides and rotates with respect to the frame.

15 Claims, 3 Drawing Sheets

POST PULLER

BACKGROUND OF THE INVENTION

This invention relates to a post puller suitable for mounting on a tractor or the like for use by people such as farmers and fence builders.

The conventional way of pulling fence posts is to use a tractor with a front end loader and a length of chain. The operator of the tractor, who usually works alone, moves the tractor into position near the post to be pulled, then moves the bucket to a position over the post to be pulled. The operator must then dismount from the tractor and attach the chain to the post. The operator must then remount the tractor and raise the bucket to pull the post, then lower the bucket to place the post on the ground so that the chain can be removed. The operator must then dismount the tractor and remove the chain, then remount the tractor to move the tractor to the next post.

All this motion is physically arduous, and difficult for many people to perform. It also requires several minutes of motion to complete the actions necessary for the pulling of each post.

A fence post puller which can be used without having to dismount from the tractor would be physically easier to use as well as faster to use, and would be well received.

A fence post puller which is adapted to be bolted to the front end loader bucket and thus requires no special tools for installation would also be desirable.

OBJECTS OF THE INVENTION

It is an object of this invention to provide a post puller which is configured to be bolted to the bucket of a front end loader mounted to a tractor.

It is a further object of this invention to provide a post puller which can be used to pull and release posts without dismounting from the tractor.

It is a another object of this invention to provide a post puller which is rugged in construction and speedy to use.

The fulfillment of these and other objects of the invention will become more apparent from the following detailed description, drawings and claims.

SUMMARY OF THE INVENTION

The method of the invention entails lowering a collar over a top end of the post. The collar is carried by a suitable frame. The frame is preferably attached to a bucket which preferably forms a portion of a front end loader attached to a tractor. The bucket of the front end loader is tilted to engage an upper end and a lower end of the collar with the post. The bucket is then raised to pull the post from the earth.

In a preferred embodiment of the invention, the frame has an open upper end, an open lower end, a front side, and a back side. The frame has a longitudinal axis extending from the open upper end to the open lower end. The collar is mounted inside of the frame. The collar has an open upper end positioned near the open upper end of the frame, an open lower end positioned near the open lower end of the frame, a front side positioned near the front side of the frame, and a back side positioned near the back side of the frame. The collar defines a passage having a longitudinal axis extending from the open upper end to the open lower end.

DETAILED DESCRIPTION OF THE INVENTION

Figure 1:
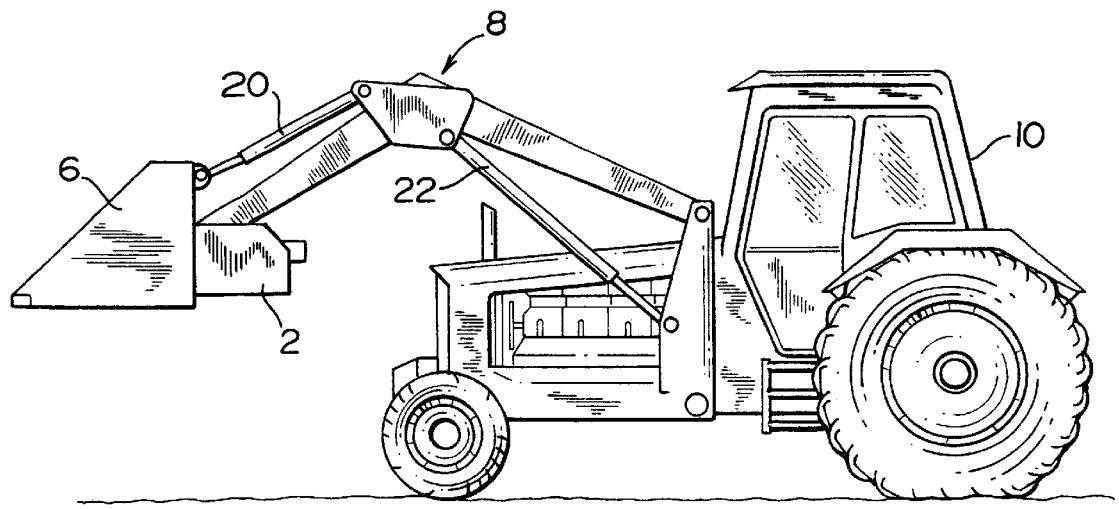
FIG. 1 pictorially shows the post puller of the invention attached to the back wall of the bucket of a front end loader.
Figure 3:
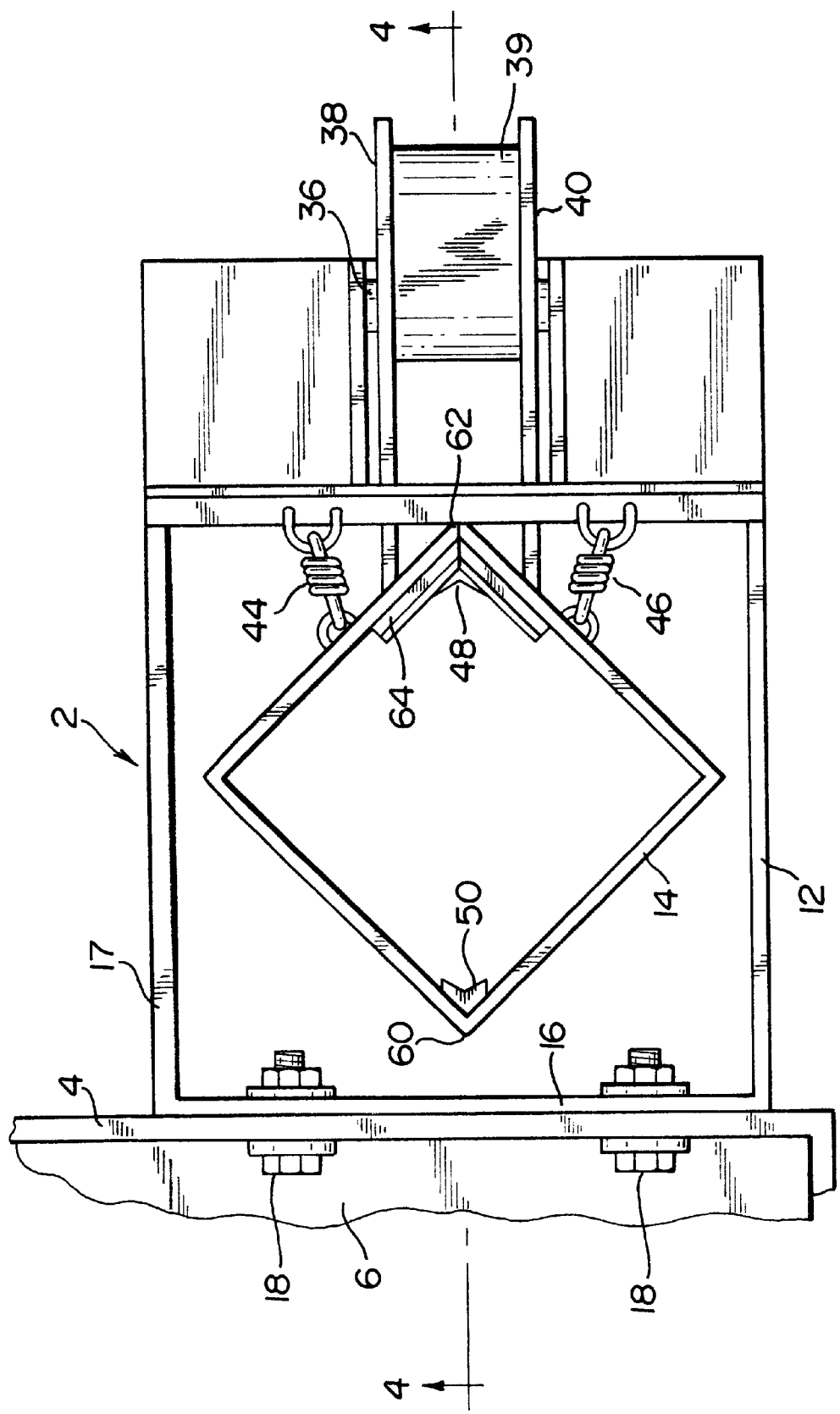
FIG. 3 is a top side view looking downwardly at the post puller as shown in FIG. 1.

In FIG. 1, the puller 2 is mounted to the back side wall 4 (see FIG. 3) of a bucket 6. The bucket forms a part of a front end loader assembly 8 which is operably attached for use on a tractor 10. With reference to FIG. 3, the puller 2 comprises a frame 12 and a collar 14. The frame 12 has a front side wall 16 which is attached to the back side wall 4 of the bucket, such as by bolts 18.

Figure 2:
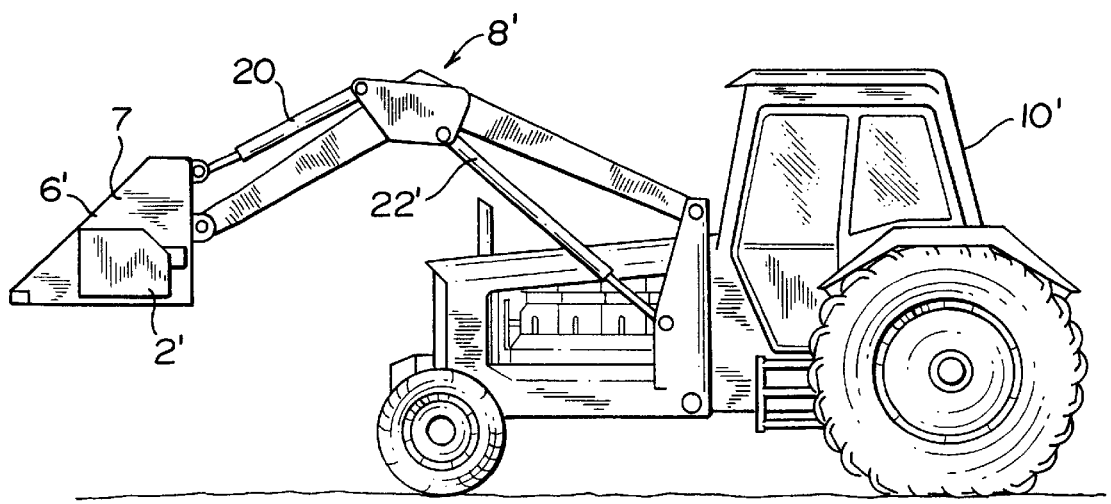
FIG. 2 pictorially shows the post puller of the invention attached to the side wall of the bucket of a front end loader.

In FIG. 2, the puller 2' is mounted to the side wall 7 of the bucket 6'. This can be accomplished by passing bolts though the side wall 17 of the frame 12 shown in FIG. 3 and into the side wall of the bucket.

It is preferred to mount the puller to the back side wall of the bucket as shown in FIG. 1. However, where the back side wall of the bucket is curved, it is acceptable to mount the puller on the side wall of the bucket as shown in FIG. 2. The puller can be mounted in an analogous manner to the side wall of the bucket of a back hoe if desired. For convenience, the invention will be further described with reference to the mounting option shown in FIG. 1.

Figure 4:
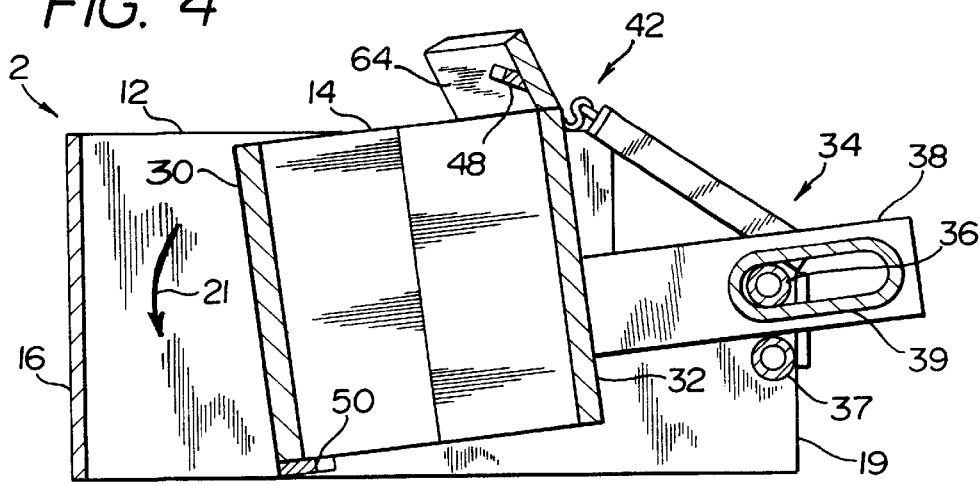
FIG. 4 is a cross sectional view taken along lines 4—4 of FIG. 3 showing the puller in an orientation to engage a post to be pulled.

The method of the invention entails lowering the collar 14 over a top end of the post, not shown. To accomplish this, the equipment is positioned as shown in FIG. 1. The frame 12 and collar 14 of the puller 2 will then be positioned as shown in FIG. 4.

The bucket 6 is then tilted outward, top end away from the tractor 10 to engage the upper end and the lower end of the collar 14 with the post to be pulled. (See FIG. 5) referring to FIG. 1, this is accomplished by extending hydraulic unit 20. The frame 12 is rotated in the direction indicated by the arrow 21 in FIG. 4 until the collar 14 binds on the post.

The bucket 6 is then raised to pull the post. Referring to FIG. 1, this is accomplished by extending hydraulic unit 22. As the bucket is raised, it moves in an arc, and rotates to some degree, causing the frame 14 to move in the direction indicated by the arrow 23 in FIG. 5. The collar, under tension from the post, attempts to remain in position, and undergoes a shift in position with respect to the frame 12.

Figure 6:
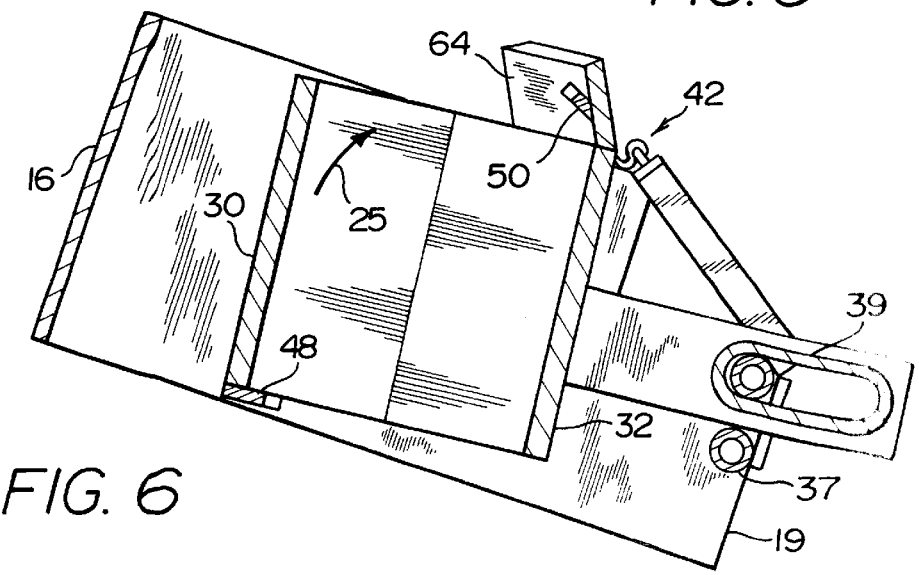
FIG. 6 is a cross sectional view showing the puller in an orientation for releasing a previously pulled post.

Once the bucket has been raised sufficiently to pull the post from the earth, the degree of rotation of the collar will be such that spring 24 will pull the collar back to its starting position, as indicated by arrow 25 in FIG. 6. Once the collar has been adequately tilted, the post will then automatically fall to the earth under its own weight, and the operator may then move the tractor to the next post to be pulled.

With the invention, it is possible for a single operator to pull about 100 posts per hour, which is ¼ mile or more of fence posts. Using the prior art technique of pulling the posts with a chain, about 25 posts per hour is all that can be managed by a healthy person able to get on and off the tractor easily. The invention thus provides a substantial advantage over the prior art.

In a preferred embodiment of the invention, the frame 12 has an open upper end, an open lower end, a front side 16, and a back side 19. The frame has a longitudinal axis extending from the open upper end to the open lower end. The collar 14 is mounted inside of the frame 12. The collar has an open upper end positioned near the open upper end of the frame, an open lower end positioned near the open lower end of the frame, a front side 30 positioned near the front side of the frame, and a back side 32 positioned near the back side of the frame. The collar defines a passage having a longitudinal axis extending from the open upper end to the open lower end.

Mounting means 34 is provided for mounting the collar inside of the frame for tilting movement of the upper end of the collar away from the back side of the frame. The mounting means 34 preferably mounts the collar for tilting movement from a first position wherein the longitudinal axis of the collar is generally parallel to the longitudinal axis of the frame (See FIGS. 4 and 6) to a second position in which the upper end of the collar is tilted toward the front side of the frame (See FIG. 5). The mounting means 34 further preferably provides for mounting the collar inside of the frame for sliding movement of the collar away from the back side of the frame, (see FIG. 5), more preferably, for sliding movement from a first position wherein the back side of the collar is spaced apart a first distance from the back side of the frame to a second position wherein the back side of the collar is spaced apart a second distance from the back side of the frame, the second distance being greater than the first distance.

In the illustrated embodiment of the invention, the mounting means 34 is formed by a pin 36 and a pair of elongated plates 38 and 40 which form a stem extending from the collar body. The pin 36 extends across the back side of the frame 12. The pair of elongated parallel plates extend from the back side of the collar 14. Each plate defines an elongated slot which is elongated in the direction of its respective plate. The slot has a front end and a back end and the pin 36 extends through the slots defined by the pair of plates to mount the collar inside of the frame. The collar is pivotally and slidably mounted to the pin. Preferably, a spacer plate 39 connects the parallel plates and positions the parallel plates in fixed relationship. In the illustrated embodiment, the spacer plate 39 is peripherally positioned around the slots formed in the pair of elongated plates 38 and 40. The design reduces stresses on the pin and the likelihood of damage incurred during use of the device.

Figure 5:
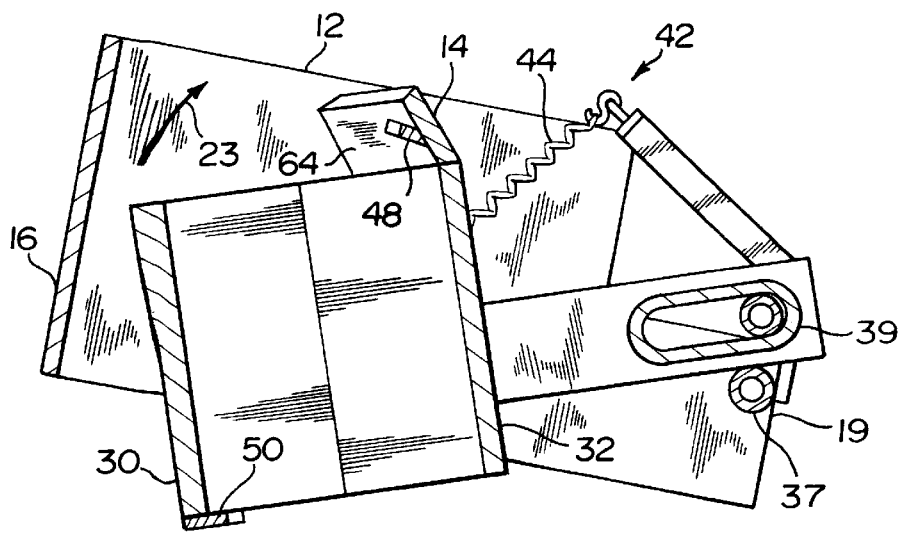
FIG. 5 is a cross sectional view showing the puller in an orientation for pulling a previously engaged post.

The illustrated arrangement permits the collar to pivot from a first angular position toward the upper end of the frame (see FIG. 4) to a second angular position toward the lower end of the frame (see FIG. 5) as well as to slide from a first latitudinal position toward the back side of the frame (see FIG. 4) to a second latitudinal position toward the front side of the frame (see FIG. 5). The pin is positioned adjacent the front end of the slot when the collar is in the first latitudinal position and is positioned adjacent the second end of the slot when the collar is in the second latitudinal position. A slot length in the range of 1–4 inches will provide good results.

In a particularly preferred embodiment, a second pin 37 positioned across the back side of the frame at a position between the first pin 36 and the bottom end of the frame. The first parallel plate and the second parallel plate contact the second pin when the collar is in the second pivotal position. The second pin thus limits the downward travel of the collar and provides the mechanism to tilt the collar top end toward the tractor to release the post.

The post puller preferably further comprises a biasing means 42 connected to the collar 14 and the frame 12 for urging the collar toward the first angular position and the first latitudinal position. The biasing means 42 preferably comprises a spring 44. More preferably, the biasing means comprises a first spring 44 connected to an outer surface of the back side of the collar 14 and the upper end of the back side of the frame 12 and a second spring 46 connected to the outer surface of the back side of the collar 14 and the upper end of the back side of the frame. See FIG. 3. The springs effectively suspend the collar within the frame, when under no-load conditions, with the stem providing an additional contract point between the collar and the frame.

It is further preferred to provide a first plurality of teeth 48 positioned at the upper end of the collar and extending inwardly from the back side of the collar and a second plurality of teeth 50 positioned at the lower end of the collar and extending inwardly from the front side of the collar. The teeth provide a better grip on the post to be pulled and permit the puller to be used on posts of different diameters.

Although the collar can have any desired cross section, an angular cross section such as trapezoidal or square is preferred, since it better accommodates a spectrum of post sizes. In the illustrated embodiment, the collar has a generally square cross-section and defines a first corner 60 and an opposite second corner 62 and is positioned in the frame so that the first corner faces the front side of the frame and the second corner faces the back side of the frame. A roof structure 64 partially closes the open upper end of the collar. The roof structure extends from the back side of the collar generally upwardly and toward the front side of the collar. The roof structure provides greater reliability in gripping the post.

The post puller of the invention can generally be constructed of mild steel plate having a thickness in the range of 3/16 to about 1/4 inch or more. It is preferred to utilize heavy walled steel pipe for the pins.

While certain preferred embodiments of the invention have been described herein, the invention is not to be construed as being so limited, except to the extent that such limitations are found in the claims.

What is claimed is:

1. Apparatus comprising
    a frame having an open upper end, an open lower end, a front side, and a back side, said frame having a longitudinal axis extending from the open upper end to the open lower end; and
    a collar mounted inside of the frame, said collar having an open upper end positioned near the open upper end of the frame, an open lower end positioned near the open lower end of the frame, a front side positioned near the front side of the frame and a back side positioned near the back side of the frame, said collar defining a passage having a longitudinal axis extending from the open upper end to the open lower end;
    a pin extending across the back side of the frame, and
    a pair of elongated parallel plates extending from the back side of the collar, each said plate defining an elongated slot which is elongated in the direction of its respective plate, said slot having a front end and a back end,
    wherein the pin extends through the slots defined by the pair of plates to mount the collar inside of the frame, and
    the collar is pivotally and slidably mounted to the pin.

2. Apparatus as in claim 1 wherein the collar pivots from a first angular position toward the upper end of the frame to a second angular position toward the lower end of the frame and slides from a first latitudinal position toward the back side of the frame to a second latitudinal position toward the front side of the frame.

3. Apparatus as in claim 1 further comprising biasing means connected to the collar and the frame for urging the collar toward the first angular position and the first latitudinal position.

4. Apparatus as in claim 3 wherein the biasing means comprises a spring.

5. Apparatus as in claim 3 wherein the biasing means comprises a first spring connected to an outer surface of the back side of the collar and the upper end of the back side of the frame and a second spring connected to the outer surface of the back side of the collar and the upper end of the back side of the frame.

6. Apparatus as in claim 1 further comprising a first plurality of teeth positioned at the upper end of the collar and extending inwardly from the back side of the collar.

7. Apparatus as in claim 6 further comprising
   a second plurality of teeth positioned at the lower end of the collar and extending inwardly from the front side of the collar.

8. Apparatus as in claim 1 further comprising
   a spacer plate connecting the parallel plates and positioning the parallel plates in fixed relationship.

9. Apparatus as in claim 1 wherein
   the pin is positioned adjacent the front end of the slot when the collar is in the first longitudinal position and is positioned adjacent the second end of the slot when the collar is in the second longitudinal position.

10. Apparatus as in claim 1 wherein the collar has a generally square cross-section and defines a first corner and an opposite second corner and is positioned in the frame so that the first corner faces the front side of the frame and the second corner faces the back side of the frame.

11. Apparatus as in claim 10 wherein the collar further comprises a roof structure partially closing the open upper end of the collar, said roof structure extending from the back side of the collar generally upwardly and toward the front side of the collar.

12. Apparatus as in claim 1 further comprising, in combination
   a tractor having a front end,
   a front end loader operably attached to the front end of the tractor, said front end loader including
   a bucket having a back side wall,
   wherein the front side of the frame is attached to the back side wall of the bucket.

13. Apparatus as in claim 1 further comprising, in combination
   a tractor having a front end,
   a front end loader operably attached to the front end of the tractor, said front end loader including
   a bucket having a side wall,
   wherein a side wall of the frame is attached to the side wall of the bucket.

14. A method for pulling a post from the earth, said method comprising lowering a collar over a top side of the post;
   said collar being carried by a frame,
   said frame having an open upper end, an open lower end, a front side, a back side and a longitudinal axis extending from the open upper end to the open lower end, said collar being mounted inside of the frame and having an open upper end positioned near the open upper end of the frame, an open lower end positioned near the open lower end of the frame, a front side positioned near the front side of the frame, a back side positioned near the back side of the frame, and defining a passage having a longitudinal axis extending from the open upper end to the open lower end,
   wherein a pin extends across the back side of the frame, a pair of elongated parallel plates extend from the back side of the collar, and a spacer plate connects the elongated parallel plates and positions the elongated parallel plates in fixed relationship,
   wherein each of said elongated parallel plates defines an elongated slot which is elongated in the direction of its respective plate, each said slot having a front end and a back end, and the pin extends through the slots defined by the pair of plates to mount the collar inside of the frame, said collar being pivotally and slidably mounted to the pin, said frame being attached to a bucket,
   said bucket forming a portion of a front end loader attached to a tractor; tilting the bucket to engage an upper end and a lower end of the collar with the post; and raising the bucket to pull the post from the earth.

15. A method as in claim 14 further comprising
   tilting the bucket to disengage the post from the collar; and permitting the post to slide from the collar under its own weight.

* * * * *